April 6, 1954     E. J. GRACE, JR     2,674,695
DETERMINATION OF LEVEL OF A BODY OF MATERIAL IN A VESSEL
Filed July 27, 1950
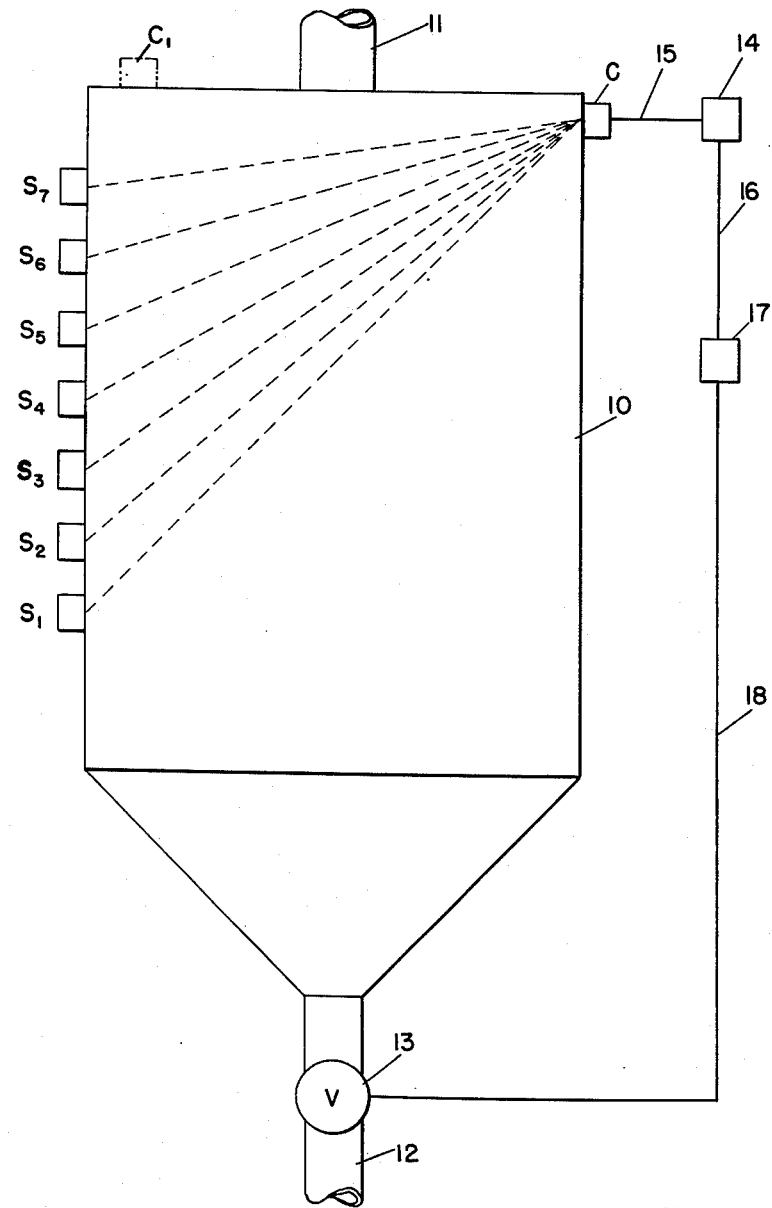
INVENTOR.
EDWARD J. GRACE, JR.
BY
Busser and Harding
ATTORNEYS Patented Apr. 6, 1954

2,674,695

UNITED STATES PATENT OFFICE 2,674,695

DETERMINATION OF LEVEL OF A BODY OF MATERIAL IN A VESSEL

Edward J. Grace, Jr., Swarthmore, Pa., assignor to Sun Oil Company, Philadelphia, Pa., a corporation of New Jersey Application July 27, 1950, Serial No. 176,171

1 Claim. (Cl. 250—43.5)

This invention relates to the determination of the level of material in a vessel or of a body of material moving through a vessel. In processes such as catalysis or other refinery operations where a hydrocarbon oil is treated it is essential to know the level of the material which is in a vessel whether the material be in liquid state or granular or pelleted form.

It is well known to use various forms of level determining devices such as gauge classes wherein the level is determined by visual observation or floats which are actuated by the material to indicate the level.

It is also well known to utilize a source of penetrative radiation in conjunction with a counter such as a Geiger counter to determine the level of liquid in a vessel. In the use of a radiation source in combination with the counter it is necessary to move both the radiation source and counter simultaneously along the vessel walls and to determine the level when a large number of radiations are picked up by the counter after the level of the liquid has been passed by the radiation source.

The present invention is directed to the utilization of penetrative radiation sources in conjunction with a counter such as a Geiger counter to indicate the level of material in a container or vessel. Particularly the vessel for the liquid or other material is provided with a series of radiation sources which are fixed along the wall of the vessel either on the inside or on the outside of the vessel wall to cooperate with a counter fixed to the vessel in a plane above the planes of the sources of radiation penetration. It is preferred to use only one counter to cooperate with the radiation sources but conceivably several counters could be employed and the level of the material indicated. Various known sources of penetrated radiation may be employed in carrying out the invention but it should be considered for the purposes of explaining the invention that radium will be the source of the radiations since it is commonly known that this element will give off gamma rays.

It is well known that the sources of penetrative radiation can only penetrate a short distance into the material in a vessel and of course the distance will vary in accordance with the molecular weight of the material in the vessel. Considering the large reaction vessels used in and around a refinery it can be estimated that the radiations would penetrate not more than several feet into a material such as petroleum products or dry granular material.

The intensity of any radiation passing through matter will be diminished by the absorption of the radiation in the matter. This absorption is usually exponential in nature and is usually a very definite function of the density of the matter. Thus, for two substances such as a hydrocarbon liquid and the gas or vapor above such liquid, the denser material will absorb a larger fraction of the radiation passing through a unit length than will the lighter material.

The radiations emitted from a source not only travel in a straight line to the counter but are dispersed in all directions into the material and are absorbed by the material. When the level passes any radiation source, the intensity of radiation received by the counter decreases proportionately as the level above that source increases until practically all radiations from that source is absorbed when the next source begins to be covered. Assuming, for example, 10 radiation sources were fixed to the vessel wall vertically thereof between its top and bottom and assuming also that each radiation source was designed to transmit 100 radiations or a total of 1,000 radiations from all of the sources to the counter and it was determined that 300 or approximately 300 radiations were picked up by the counter which as mentioned herebefore is positioned in a plane above the radiation sources then it could be readily determined that the level was generally between the third and fourth sources from the top of the chamber. This is due to the fact that the radiations emitted by the sources therebelow would be generally absorbed while the radiations emitted by the sources above the level would in general be transmitted to the counter. The vessel wall and any air or vapor above the liquid level or level of the material would absorb some of the emitted radiations and these factors plus the distance from each source to the counter are taken into consideration in determining the potency of each of the radiation sources.

Referring to the single figure of drawings 10 indicates generally a vessel having an inlet 11 at its top and an outlet 12 at its bottom having a valve 13 therein to control the flow of material from the vessel.

At $S_1$, $S_2$, $S_3$, $S_4$, $S_5$, $S_6$ and $S_7$ are shown a plurality of sources of penetration radiation which may be of any selected material. At a point in a horizontal plane above the horizontal planes of the sources is fixed to the exterior of the vessel a radiation detector or counter C. It will be understood that the sources of radiation may be secured either to the exterior of the wall or interior of the vessel and similarly the radiation detector can be positioned either exteriorly or interiorly of the vessel in carrying out the invention. At 14 is shown an amplifying unit electrically connected by line 15 to the counter C and the amplifying unit is electrically connected by line 16 to a recording potentiometer 17. The valve 13, may, if desired, be controlled by suitable electrical or pneumatic connections 18 from the amplifying unit 14 or the recording potentiometer 17. The counter C although shown fixed to the vessel wall at a position generally opposite the radiation sources can be fixed to the top of the vessel at C shown in dotted lines as long as it is fixed in a position above the upper source of radiation.

It will be understood that the radiation sources and the counter are positioned in fixed relationship about the vessel which contains material or through which material passes. It will also be understood that the number of radiations emitted by each source of radiation will be a known factor and if a large percentage of the emitted radiations are unabsorbed this fact would be determined by the counter which would indicate that the emitted radiations have not encountered any substantial body of material in the vessel. Conversely, if only a relatively small percentage of the radiations are detected by the counter this fact would indicate that the total emitted radiations have encountered or passed through a large body of material and since the radiation sources are spaced vertically of the vessel would indicate that the level of the material in the vessel is high.

I claim:

Apparatus for indicating the level of material passing continuously through a vessel between its upper inlet and lower outlet which comprises a plurality of sources of penetrative radiation spaced apart and located in fixed and close relationship to the vessel wall and in different horizontal planes between the inlet and outlet of the vessel, a counter positioned in a horizontal plane above the plane of the uppermost source of radiation for continuously receiving radiations from at least the uppermost source, an indicator positioned exteriorly of the vessel and operable by said counter for continuously indicating the level of the material in accordance with the number of radiations received by the counter and in proportion to the total number of radiations emitted by said sources.

References Cited in the file of this patent

UNITED STATES PATENTS

| Number | Name | Date |
|---|---|---|
| 2,323,128 | Hare | June 29, 1943 |
| 2,456,233 | Wolf | Dec. 14, 1948 |
| 2,534,352 | Herzog | Dec. 19, 1950 |